United States Patent
Li (10) Patent No.: US 6,829,915 B1
(45) Date of Patent: Dec. 14, 2004

(54) TRAILER LOCK

(75) Inventor: Show-Mon Li, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 0 days.

(21) Appl. No.: 10/658,327

(22) Filed: Sep. 10, 2003

(51) Int. Cl.[7] .................................................. E05B 67/36
(52) U.S. Cl. ........................ 70/18; 70/34; 70/51; 70/53; 70/58; 70/233; 70/235; 280/507
(58) Field of Search ....................... 70/14, 18, 30, 70/34, 49, 51, 53, 58, 233–236; 211/4, 5, 8, 9; 248/551–553; 280/507; 411/910

(56) References Cited

U.S. PATENT DOCUMENTS

| | | | | |
|---|---|---|---|---|
| 1,222,920 A | * | 4/1917 | Blais | 70/30 |
| 1,845,916 A | * | 2/1932 | Henke, Jr. | 70/260 |
| 1,858,893 A | * | 5/1932 | Heyer | 70/259 |
| 1,881,624 A | * | 10/1932 | Jeffers | 70/259 |
| 4,055,060 A | * | 10/1977 | Bellino | 70/234 |
| 4,571,965 A | * | 2/1986 | LeRoux | 70/227 |
| 6,055,832 A | * | 5/2000 | Wyers | 70/34 |
| 6,125,669 A | * | 10/2000 | McDaid et al. | 70/58 |
| 6,360,571 B1 | * | 3/2002 | O'Neal | 70/226 |
| 6,576,000 B2 | * | 6/2003 | Carrison | 607/92 |
| 6,672,115 B2 | * | 1/2004 | Wyers | 70/14 |
| 2002/0069681 A1 | * | 6/2002 | Golden et al. | 70/34 |
| 2004/0040347 A1 | * | 3/2004 | Vito | 70/18 |

FOREIGN PATENT DOCUMENTS

| | | | | |
|---|---|---|---|---|
| DE | 385272 | * | 11/1923 | 70/18 |
| FR | 624352 | * | 7/1927 | 70/34 |
| GB | 745101 | * | 2/1956 | 70/34 |

* cited by examiner

*Primary Examiner*—Lloyd A. Gall
(74) *Attorney, Agent, or Firm*—Troxell Law Office PLLC (57) ABSTRACT

A trailer lock comprises a rocket bolt, a lock body, and a chain couple. The inner side of the fixed end in the rocket bolt and one of the lock bodies individually has a mounting segment for matching a chain couple with a two-end mounting part and its connection. By the winch design of the chain, it can winch the carrying goods such as bicycle of the supporting base in the end of the car for achieving anti-theft purpose on carrying goods.

7 Claims, 9 Drawing Sheets

TRAILER LOCK

FIELD OF THE INVENTION

The present invention relates to a trailer lock structure. More particularly, it can provide the connection of the trailers or carrying goods, and also achieve an anti-theft purpose of the trailer lock.

BACKGROUND OF THE INVENTION

Figure 1:
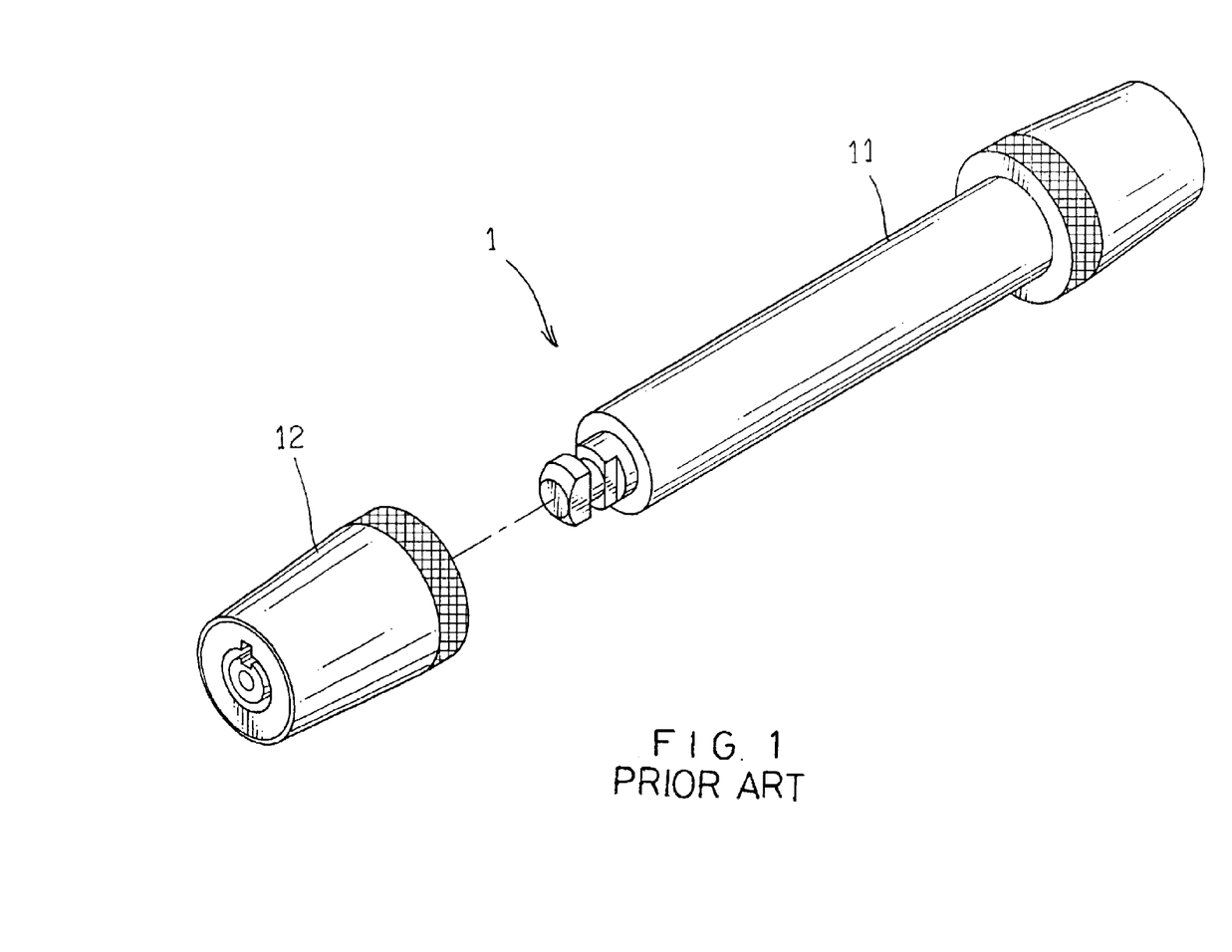
FIG. 1 is a perspective view of a conventional trailer lock.
Figure 2:
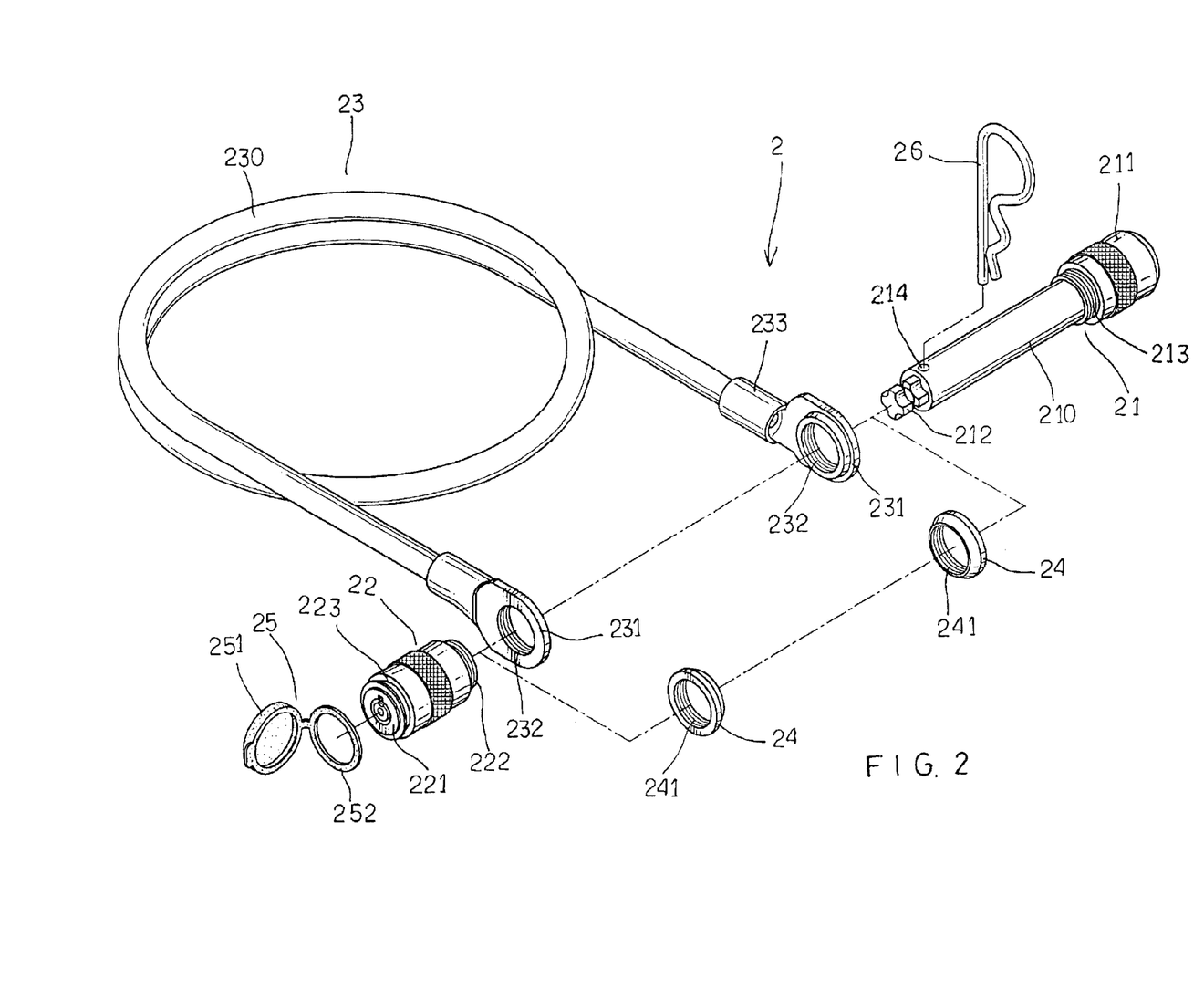
FIG. 2 is one of the preferred embodiments according to the present invention showing a perspective view.
Figure 3:
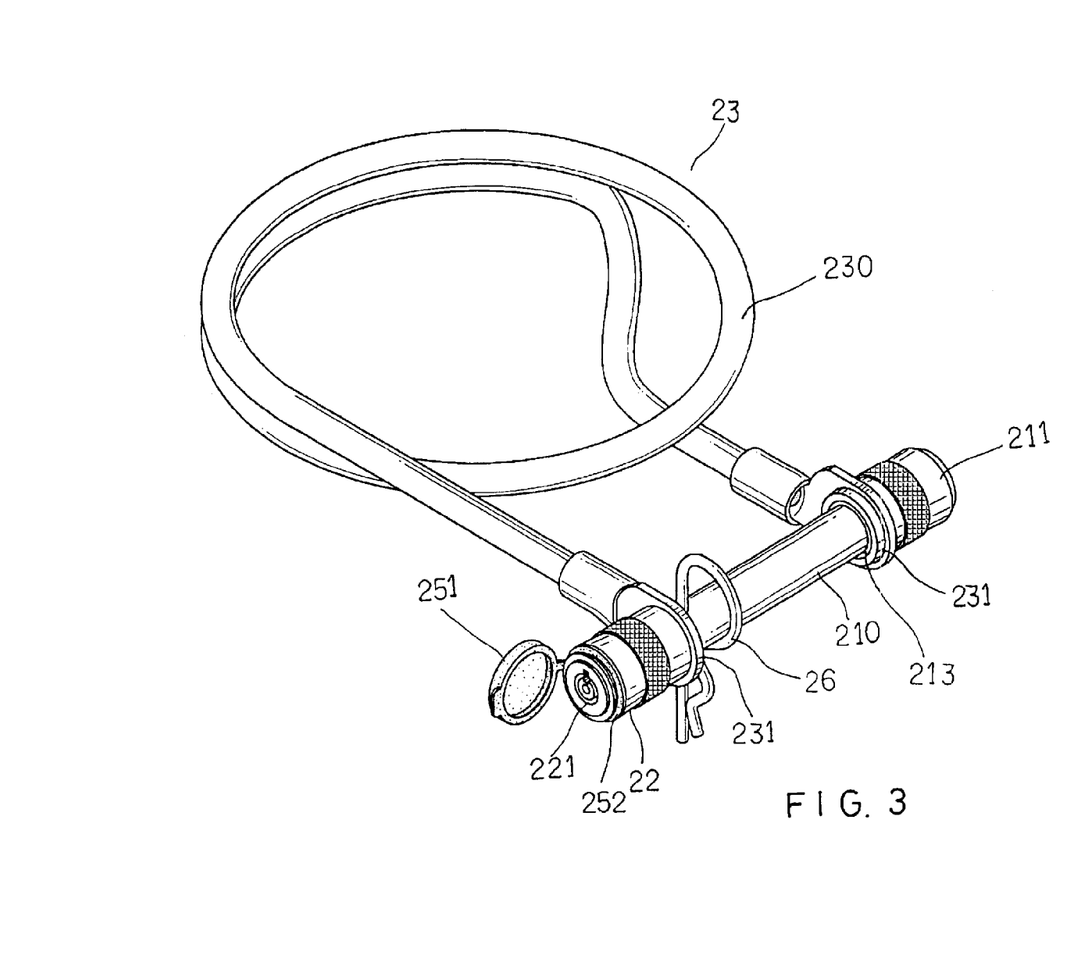
FIG. 3 is one of the preferred embodiments according to the present invention showing a perspective view.

According to the conventional trailer lock 1, the structure mainly comprises a rocket bolt 11, and a lock body 12 as shown in FIG. 1. The rocket bolt 1 is set in the connection base of the end of the car for providing an inter-link in small trailers. By the trailer lock 1, it can be against of the theft in small trailers. However, these small trailers can only provide the space for some camping facilities, foods, beverages, and etc. While carrying with bigger carrying goods, such as bicycles, it cannot be against of theft for carrying goods or bicycles caused of only one function in the interlink according to the conventional trailer design. This leads to reduce the efficiency of the anti-theft. Therefore, the present invention can overcome the shortage and provide a better improvement.

SUMMARY OF THE INVENTION

The present invention relates to a trailer lock, which comprises a rocket bolt, a lock body, and a chain couple. The inner side of the fixed end in the rocket bolt and one of the lock bodies individually has a mounting segment for matching a chain couple with a two-end mounting part and its connection. By the winch design of the chain, it can winch the carrying goods such as bicycle of the supporting base in the end of the car for achieving anti-theft purpose on carrying goods.

The main object of the present invention is to provide a trailer lock structure. More particularly, it meets the user's requirements for matching the connection with a chain couple as well as the basic function of the trailer lock. By using the winch design of the chain couple for carrying goods such as a bicycle, it can achieve the anti-theft purpose on the carrying goods.

DETAILED DESCRIPTION OF THE PREFERRED EMBODIMENTS

The forgoing and other objects, features and advantages of the present invention will be better understood from the following description taken in connection with the accompanying drawings, in which:

Please referring to FIGS. 2, 3, 4, and 5, the trailer lock 2 of the present invention mainly comprises a rocket bolt 21, a lock body 22, and a chain couple 23, which:

The rocket bolt 21 is the main body 210 of a long bar. One end of the rocket bolt has a fixed end 211 with a longer dimension, and the other end of the rocked rocket bolt has a locking bolt 212. The inner of the fixed end 211 positioning in the intersection of the fixed end and the main body 210 has a mounting segment 213. The mounting segment 213 can be an outer screw segment. More, one side neighboring to a locking bolt in the main body 210 has a hollow hole 214 for the elastic pin 26 to pin-in.

The inner of one end in the lock body 211 has a lock 221, and the other end has a mounting segment 222. The lock 221 can provide the locking bolt 212 of a rocket bolt 21 for an interlock thereto control the lock and the un-lock. More, the outer rim of the lock body has a ring drain 223 for mounting with an anti-dust cover 25 and a mounting ring 252. Also, the mounting of the cover 251 can protect the lock 221 thereto achieve the purpose of an anti-theft or a waterproof.

Figure 8:
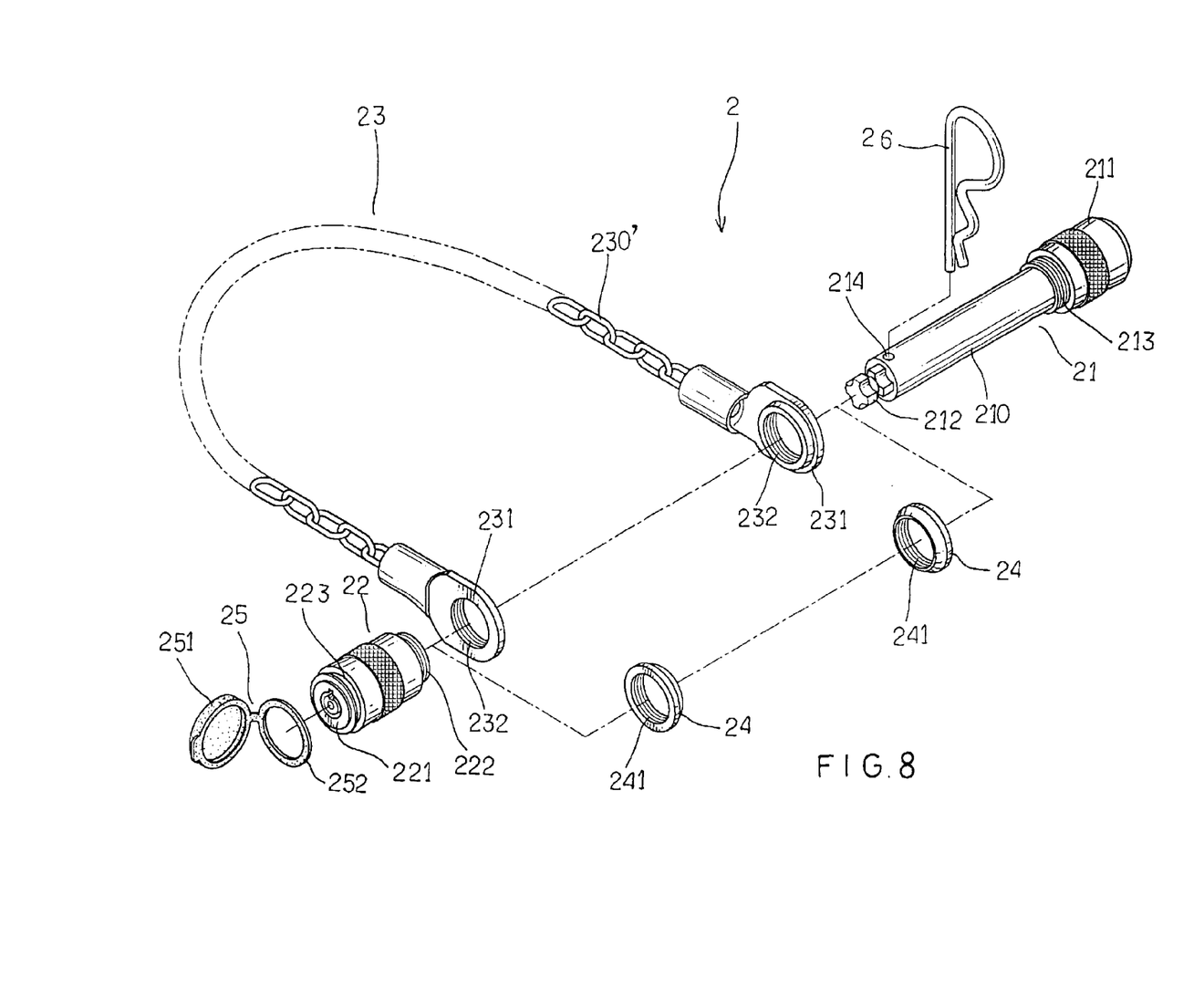
FIG. 8 is another preferred embodiment according to the present invention showing a perspective view.
Figure 9:
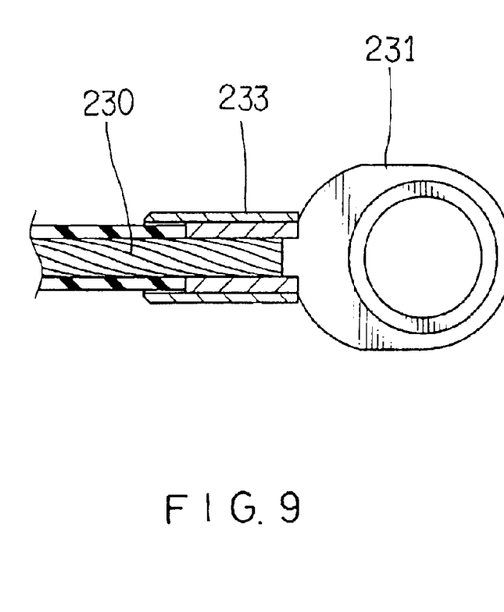
FIG. 9 is a cross-sectional view according to the present invention showing the combination between the main body of the chain couple and the both ends of the mounting parts.

The both ends of the chain couple 23 fixing with a mounting part 231 by a block 233 as shown in FIG. 9. The mounting part 231 is a ring with an inner mounting hole 232. The mounting hole can be an inner screw hole for providing the interlock of the mounting segment 213, and 222 between the rocket bolt 21 and the lock body 22 thereto achieves a better positioning of the matching efficiency. Further, the main body 230 of the chain couple 23 can be a chain 230' with the function of winching goods as shown in FIG. 8.

Figure 5:
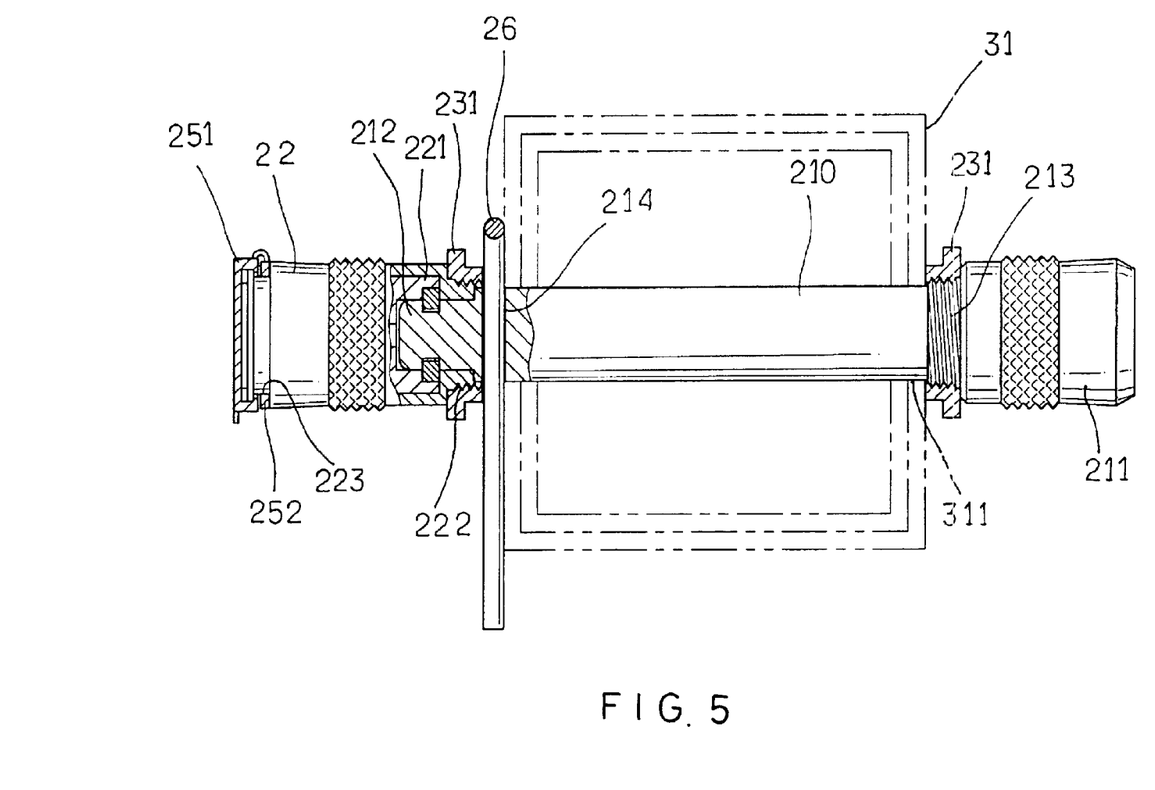
FIG. 5 is a cross-sectional view according to the present invention.
Figure 6:
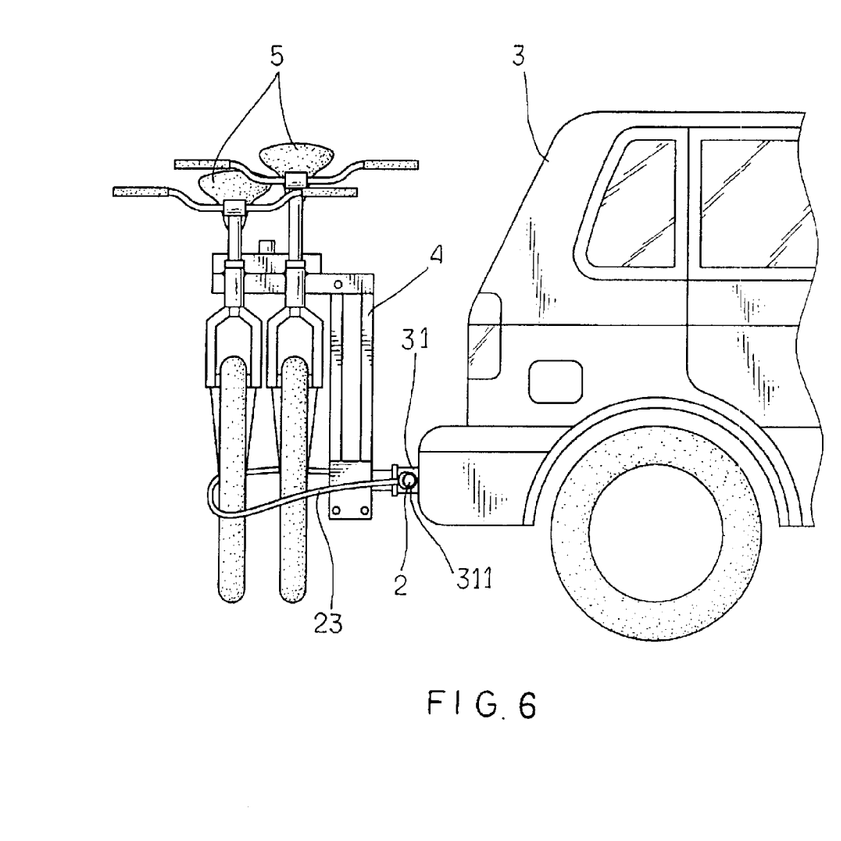
FIG. 6 is one of the preferred embodiments according to the present invention showing an operational view.

By the assembly of the above description components, the connection base 31 in the end of the car 3 provides a supporting 4 base 4 with a trailer lock 2 for the bicycles 5 while carrying the larger goods such as bikes, please referring to FIG. 5 and FIG. 6. If using the conventional trailer lock 1 herein, it only can prevent the supporting base from theft. This cannot achieve the anti-theft for bikes 5. The present invention can winch the bike 5 on the trailer lock 2 thereto an anti-theft purpose. One end of the couple part 231 in the chain couple mounts to the mounting segment 213 of the rocket bolt 21. Then, the rocket bolt is pinned into the bolt hole 311 of the connection base 31. More, the elastic pin 26 is pinned into the hollow hole 214 of the rocket bolt 21 as a position thereto anti-slide of the rocket bolt 21. Further, one of the mounting parts 231 in the chain couple 23 winches the carrying goods such as bikes, and then, the mounting segment 222 of the lock body 22 mounts into the mounting hole 232 of the mounting part 231. Then, the lock body 22 and the rocket bolt 21 are pinned-in to lock. Therefore, the trailer lock has a second connecting function of the chain couple 23 in addition to a first connector function of the rocket bold 21.

Figure 4:
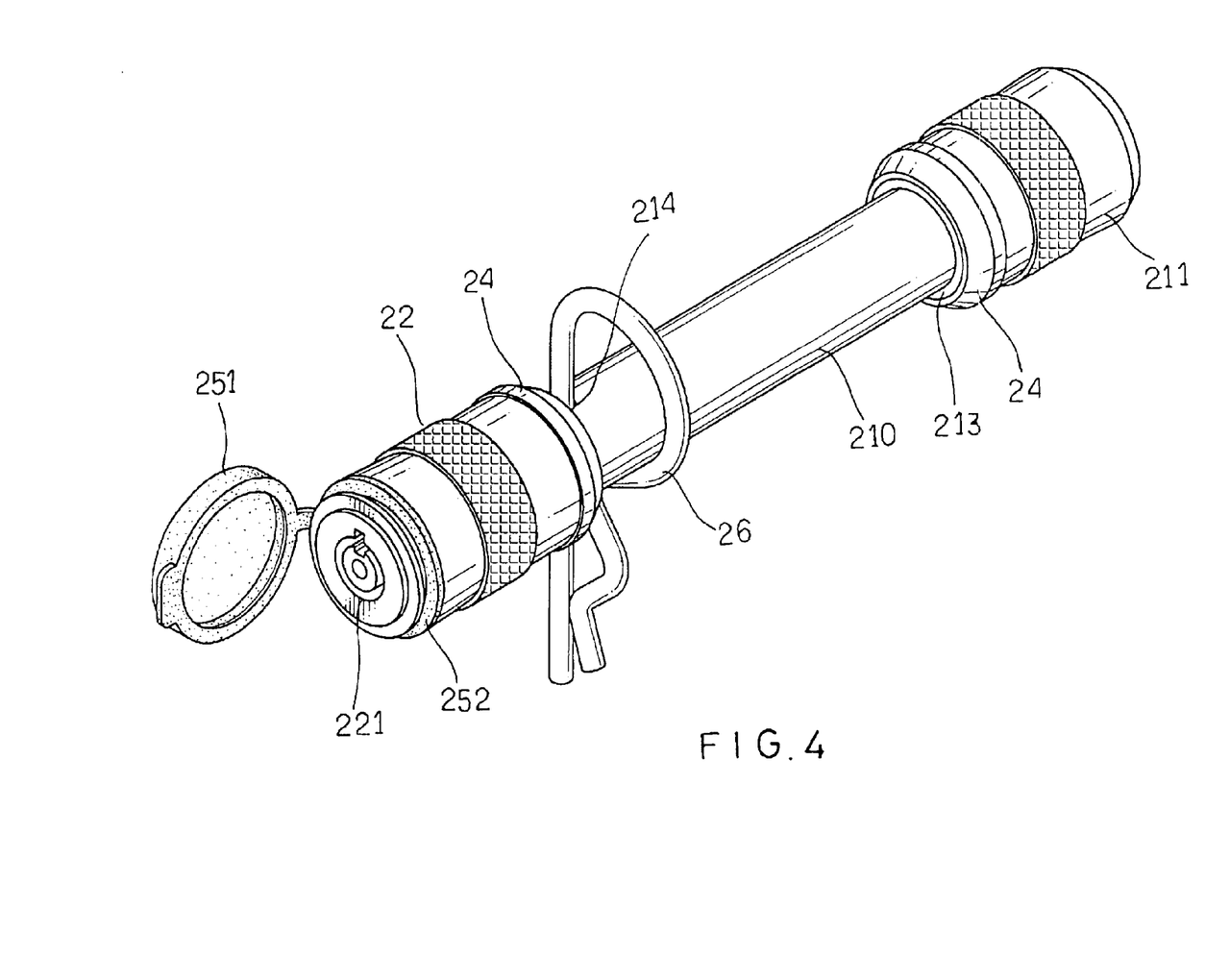
FIG. 4 is another preferred embodiment according to the present invention showing a perspective view.
Figure 7:
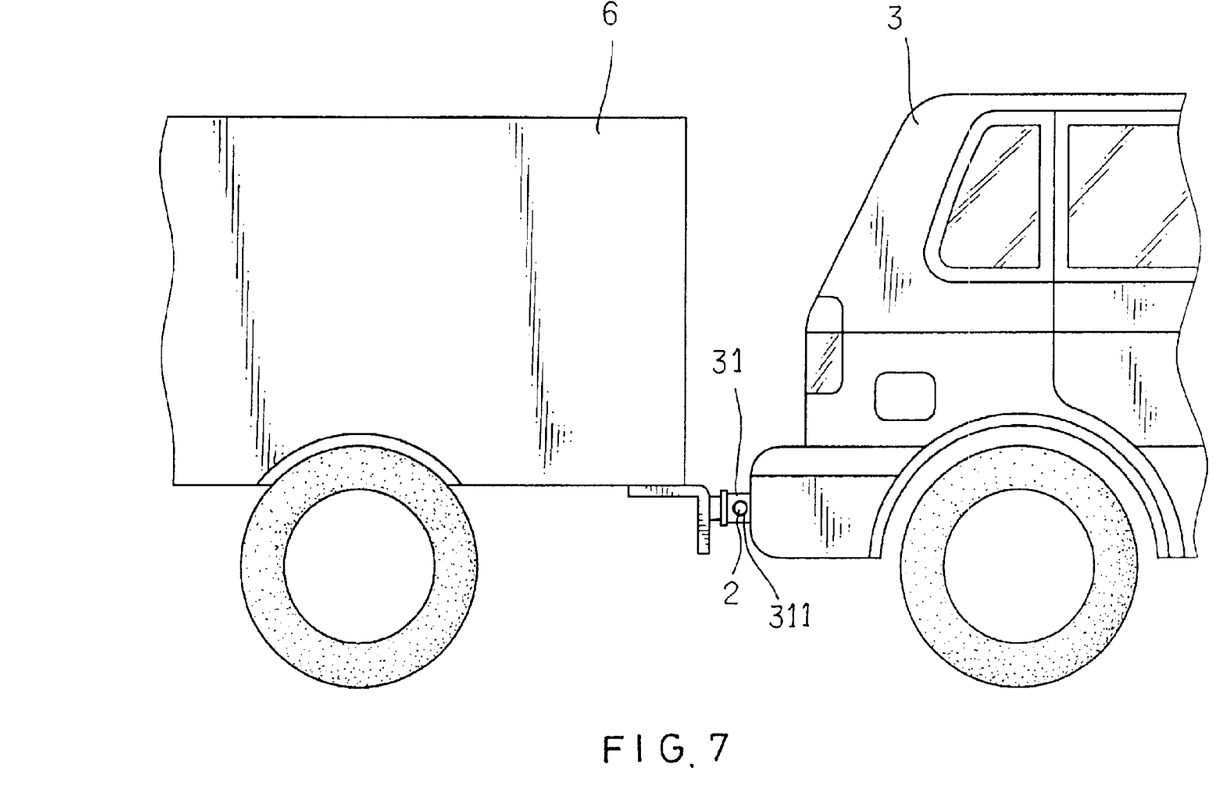
FIG. 7 is another preferred embodiment according to the present invention showing an operational view.

While only using trailer 6 for carrying in the connection, it does not require the coupling part 231 of the chain couple 23 to mount with the rocket bolt 21 and the lock body 22. The cover 24 can individually mount with mounting segments 222 and 213 of the lock body 22 and the rocket bolt 21. The cover 24 can be a cover body 241 with the inner screw hole 241. This, therefore, can achieve the purpose of a better matching ability with decoration as shown in FIG. 4 and FIG. 7.

According to the above description, the present invention can overcome the shortage of the conventional trailer lock, and provide a trailer lock with multiple functions. This can have a complete anti-theft function. As a result, it has an obvious improvement, and can legally apply to the patent.

What is claimed is:

1. A trailer lock comprising:
   a) a rocket bolt having:
      i) a main body;
      ii) a fixed end located at a first end thereof;
      iii) a connector mounting segment located between the main body and the fixed end; and
      iv) a locking bolt located at a second end thereof;
   b) a connector having:
      i) a connector main body; and
      ii) first and second mounting parts, each of the first and second mounting parts having a block and a mounting hole, the block of each of the first and second mounting parts being connected to one of two opposing ends of the connector main body, the rocket bolt is inserted through the mounting hole of the first mounting part and the first mounting part is connected to the connector mounting segment of the rocket bolt; and
   c) a lock body having:
      i) a lock removably connected to the locking bolt; and
      ii) a lock mounting segment connected to the mounting hole of the second mounting part.

2. The trailer lock according to claim 1, further comprising an anti-dust cover having a cover removably covering the lock and a mounting ring, the lock body includes a ring drain, the mounting ring is connected to the ring drain.

3. The trailer lock according to claim 1, wherein the second mounting part of the connector main body is located between the lock body and the rocket bolt when the lock body is connected to the rocket bolt.

4. The trailer lock according to claim 1, wherein the mounting hole of the first mounting part has internal threads and the connector mounting segment of the rocket bolt has external threads.

5. The trailer lock according to claim 1, wherein the lock mounting segment has external threads and the mounting hole of the second mounting part has internal threads.

6. The trailer lock according to claim 1, further comprising a hole located through the main body of the rocket bolt adjacent to the locking bolt, and an elastic pin inserted through the hole.

7. The trailer lock according to claim 1, wherein the connector main body is a chain.

* * * * *